US 7,367,063 B1

(12) United States Patent
O'Toole, Jr.

(10) Patent No.: US 7,367,063 B1
(45) Date of Patent: Apr. 29, 2008

(54) METHODS AND APPARATUS FOR PROVIDING SECURITY TO A COMPUTERIZED DEVICE

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 706 days.

(21) Appl. No.: 10/245,168

(22) Filed: Sep. 17, 2002

(51) Int. Cl.
G08B 29/00 (2006.01)
(52) U.S. Cl. .......................... 726/34; 726/35; 713/183
(58) Field of Classification Search ............ 726/22–26, 726/27, 33–36, 16, 2; 713/182–183, 176, 713/185, 2, 1, 9, 20, 100; 709/220–222; 702/182–187; 714/100, 39, 44; 700/26
See application file for complete search history.

(56) References Cited

U.S. PATENT DOCUMENTS

| 4,888,771 | A | * | 12/1989 | Benignus et al. ............. 714/26 |
| 5,367,647 | A | * | 11/1994 | Coulson et al. ............. 710/105 |
| 5,564,054 | A | * | 10/1996 | Bramnick et al. ............. 713/2 |
| 5,666,294 | A | * | 9/1997 | Takada et al. ............... 702/182 |
| 5,682,529 | A | * | 10/1997 | Hendry et al. ............... 713/100 |
| 5,745,669 | A | * | 4/1998 | Hugard et al. .................. 714/3 |
| 5,887,131 | A | * | 3/1999 | Angelo ......................... 726/20 |
| 5,982,899 | A | * | 11/1999 | Probst ............................ 713/1 |
| 6,085,244 | A | * | 7/2000 | Wookey ...................... 709/224 |
| 6,161,178 | A | * | 12/2000 | Cromer et al. .................. 713/2 |
| 6,212,635 | B1 | | 4/2001 | Reardon ...................... 713/165 |
| 6,263,441 | B1 | * | 7/2001 | Cromer et al. ................. 726/35 |
| 6,405,318 | B1 | * | 6/2002 | Rowland ...................... 726/22 |

(Continued)

FOREIGN PATENT DOCUMENTS

WO   WO 0101362   *  6/1999

OTHER PUBLICATIONS

Gobioff, et al., "Smart Cards in Hostile Environments", School of Computer Science, Carnegie Mellon University, Sep. 14, 1995, CMU-CS-95-188, pp. 1-5.

(Continued)

*Primary Examiner*—Kim Vu
*Assistant Examiner*—Nirav Patel
(74) *Attorney, Agent, or Firm*—Chapin IP Law, LLC; Barry W. Chapin, Esq.

(57) ABSTRACT

A controller of the computerized device monitors a configuration state of the computerized device by maintaining a record of the hardware or software configuration of the computerized device and recording, between user sessions, any detectable attachments or detachments of peripheral devices relative to the computerized device. The controller provides a two-level login procedure for the computerized device that ensures the user's high-security credentials are not presented to the controller until after the user has had the opportunity to be warned of detected configuration changes with respect to the computerized device.

The controller provides a first login query to a user for a password. Upon reception of a successful first login response, the controller displays a warning screen that indicates, for example, whether the controller has detected any change to the hardware or software configuration of the computer since the user's last session. The controller then provides a second login query to the user for a password. At this point, the user can decide whether to risk continuing through the second-level login procedure, depending upon the information contained within the warning screen.

27 Claims, 7 Drawing Sheets

U.S. PATENT DOCUMENTS

| | | | |
|---|---|---|---|
| 6,542,995 B2 * | 4/2003 | Heinrich et al. | 726/19 |
| 6,662,240 B1 * | 12/2003 | Siefert | 710/8 |
| 6,681,331 B1 * | 1/2004 | Munson et al. | 726/23 |
| 6,731,993 B1 * | 5/2004 | Carter et al. | 700/94 |
| 6,754,817 B2 * | 6/2004 | Khatri et al. | 713/1 |
| 6,760,796 B1 * | 7/2004 | Rossmann et al. | 710/72 |
| 6,779,134 B1 * | 8/2004 | Laviolette et al. | 714/38 |
| 6,990,600 B2 * | 1/2006 | Ryan et al. | 714/3 |
| 2002/0108058 A1 * | 8/2002 | Iwamura | 713/201 |

OTHER PUBLICATIONS

Freudenthal, et al., "Personal Security Environment on Palm PDA", Cybernetica Tartu Lab, pp. 1-7, 2000.

Wobber, et al., "Authentication in the Taos Operating System", Digital Equipment Corporation, 14$^{th}$ ACM Symposium on Operating System Principles, Dec. 1993. pp. 1-27.

* cited by examiner

METHODS AND APPARATUS FOR PROVIDING SECURITY TO A COMPUTERIZED DEVICE

BACKGROUND OF THE INVENTION

Corporate espionage involves the theft of a corporation's business data and intellectual property, including product designs, manufacturing processes, product prototypes, and software codes. Because a company's business data and intellectual property are vital to the success of the company, corporate espionage conducted by a competitor can adversely affect the development of products and the potential profit realized by the company. For example, U.S. companies lose approximately $100 billion annually in sales as a result of corporate espionage.

In one method of corporate espionage, a corporation "plants" an employee within a competitor company to monitor and gather business information from that company. Once associated with the organization, the corporate spy can obtain confidential information about the targeted company by exploiting temporary physical access to computerized devices used by the company, such as personal computers.

Many types of computerized devices, such as personal computers, include security mechanisms that detect changes to the hardware configuration (e.g., hard drive, memory) associated with the computer and provide a warning to an end user of the detected changes. Such a warning can arouse an end user's suspicions regarding a breach in the security of a particular computerized device, such as caused by a corporate spy.

One type of security mechanism is a "case opened" switch, such as found in "tamper-proof" devices and computers used in high-security government offices. The "case opened" switch is typically a capacitor that discharges when a shell or case of the computerized device is removed from the device. After detecting a discharge of the capacitor, the computerized device provides a warning to the end user, thereby indicating removal of the case from the computerized device and potential tampering of the hardware within the computerized device by an unauthorized user.

Another typical security mechanism is a recent-activity notification screen, displayed to an end-user, after logging into the computerized device. For example, in typical computer security, the operating system of a computerized device displays a message to an end user indicating the time and date of the user's previous login. The message provides an opportunity for the user to compare the displayed time and date of the last login with the user's known time and date of his last login. In the case of a discrepancy, the user is thus made aware of the possibility that some third party has learned the user's password and that the third party has logged into the computer using the password.

SUMMARY OF THE INVENTION

Conventional techniques and mechanisms that provide for computerized device security suffer from a variety of deficiencies. As an example, with the "case opened" switch, where the switch is a charged capacitor, when a user opens the case of a computerized device, the user causes the capacitor to discharge. When the computerized device detects that the capacitor has discharged, the computer can warn the user that the computer's case was opened, thereby indicating the possibility of tampering of the hardware within the computerized device by an unauthorized user. While the "case opened" switch, indicates potential tampering with computer components located inside of the computerized device, the switch does not, however, indicate potential tampering with, or removal of, computer components (e.g., hard drive, memory) located external to the case of the computerized device.

One available method for attacking and compromising an individual computing device involves an attacker exploiting temporary physical access to the computerized device to make a minor alteration to its software or hardware configuration. Such an alteration can render the device vulnerable to a later remote attack or cause the device to capture information that enables a remote attack.

One type of computerized device attack involves a keyboard-capture attack. The attacker visits the computerized device and, without logging into the device and without the device being in an operational state (e.g., "on"), detaches a cable connecting a keyboard or control console from the device. The attacker then inserts a small keystroke-archive module (e.g., the KeyGhost product sold by Working Technologies of New Zealand) and reconnects the keyboard/console cable so that the cables between the computer and the keyboard each connect to the keystroke-archival device. When a user logs into the compromised machine, the archive module records the keystrokes of the user's login information. The attacker can then retrieve the login information from the archive module and, using the login information, gain access to data associated with the computerized device at a future time. Such an attack can compromise nearly any existing router, switch, or desktop computer without tripping the "case opened" switch.

Another deficiency of the conventional computerized device security techniques relates to recent-activity notification screens displayed to an end-user before he logs into, or gain access to, the computerized device. While a recent-activity notification screen indicates to the user whether or not a third party has learned the user's password and has logged into the computer, the screen does not indicate the presence of non-login based attacks, such as the keyboard-capture attack, described above. The recent-activity notification screen, therefore, does not provide warning as to modification or replacement of components associated with the computerized device.

By contrast, embodiments of the present invention significantly overcome such deficiencies and provide mechanisms and techniques for providing security to a computerized device. In one embodiment, a controller of the computerized device maintains a record of the hardware or software configuration of the computerized device. The controller records, within a storage location, any detectable attachments or detachments of peripheral devices relative to the computerized device. The controller reports the detected attachments or detachments to the user to indicate the possibility of the occurrence of a computerized device attack.

The controller also provides a two-level login procedure for the computerized device. The controller provides a first login query to a user for a password and, upon reception of a successful first login response, the controller displays a warning screen that indicates a change in the configuration of the computerized device. For example, the warning screen can indicate whether the controller has detected any change to the hardware or software configuration of the computer since the user's last session, what the detected changes were, the time of the change, and when, if ever, the peripheral attachment or detachment detection circuitry and logic were unable to perform their monitoring because of a loss of power to the computerized device. The controller then provides a second login query for a password to the user. At this point, the user can consider whether to risk continuing through the second-level login procedure, depending upon the information contained within the warning screen. The two-level login scheme ensures that the user's high-security credentials are not presented to the operating system, thereby running the risk of password capture, for example, by keystroke-archival devices until after the user has had the opportunity to be warned of detected configuration changes with respect to the computerized device.

In one embodiment, the invention relates to a method for providing security to a computerized device. In the method, a controller monitors a configuration state of the computerized device, provides a first login query to a user, provides configuration state information in response to receiving a login entry from the first login query where the configuration state information indicates the configuration state of the computerized device, and provides a second login query in response to receiving the login entry from the first login query. By providing a two-level login along with a warning regarding changes to the configuration state of the computerized device, the controller provides the user with the opportunity to stall the login procedure and address the security status of the computerized device.

In one embodiment, the controller repeats the step of monitoring at a periodic interval. The more often the controller monitors the configuration state of the computerized device (e.g., the greater the frequency of the periodic monitoring interval), the greater the controller's ability to detect a breach in the security or a change in the configuration state of the computerized device.

In another embodiment the controller monitors a configuration state of the computerized device during a time period between a logout event and a login event. By monitoring the configuration state of the computerized device during this time period, the controller can detect any changes to the configuration state of the computerized device during a period when the user has no contact with the computerized device.

In another embodiment, when monitoring, the controller monitors an attachment event for a peripheral component, monitors a peripheral component identity when the peripheral component undergoes the attachment event, and monitors a time of the attachment event for the peripheral component. The controller stores at least one of the attachment event, the peripheral component identity, and the time of the attachment event as configuration state information within a storage location. The controller provides the information to the user in order to allow the user to make an informed decision regarding proceeding with the login procedure.

In another embodiment, during the monitoring process, the controller detects a loss of power of the computerized device and detects a time associated with the loss of power of the computerized device. The controller then stores the loss of power event and the time associated with the loss of power as configuration state information within a storage location. Based on this information, the user can determine if the power loss is specific to his computer or is a general power failure. Occurrence of power outages at regular intervals specific to a particular computerized device can indicate the possibility of tampering.

In another embodiment, the controller stores an initial configuration state of the computerized device within a storage location. The controller also monitors a subsequent configuration state of the computerized device and compares the initial configuration state of the computerized device and the subsequent configuration state of the computerized device to detect a variance between the states of the computerized device where the variance relates to the configuration state information of the computerized device. By comparing the initial configuration state of the computerized device with a subsequent configuration state, the controller determines any changes to the configuration of the computerized device, thereby indicating the possibility of a hardware or software attach on the computerized device. In another embodiment, the controller stores the configuration state information containing the variance within the storage location, such as a tamper-proof memory, thereby allowing later retrieval of the information.

In another embodiment, when monitoring the subsequent configuration state, the controller detects an attachment event with respect to a peripheral component associated with the computerized device. The controller can therefore detect the removal or attachment of a peripheral device, thereby indicating the possibility of an attacker's tampering with the computerized device.

In another embodiment, when monitoring the subsequent configuration state, the controller retrieves identification data, such as model number or serial number information, from a peripheral component in communication with the computerized device and compares the identification data of the peripheral component with identification data logged in the initial configuration state of the computerized device. In an alternate embodiment, when monitoring the subsequent configuration state, the controller requests a digitally signed identification value from the peripheral component and compares the digitally signed identification value of the peripheral component with a digitally signed identification value logged in the initial configuration state of the computerized device. By performing such a comparison, the controller can detect the replacement of an associated peripheral device, thereby indicating the possibility of an attacker's tampering with the computerized device.

In another embodiment, the controller stores the initial configuration state having an associated digital signature value on a removable storage device relative to the computerized device. After providing the first login query the controller retrieves the initial configuration state and the associated digital signature value from the removable storage device and performs an authentication process for the initial configuration state retrieved from the removable storage device using the digital signature value. By authenticating the initial configuration state of the computerized device in this manner, the controller can ensure that a user has not tampered with the initial configuration state information on the removable storage device. Use of the removable storage device, furthermore, provides an additional level of security for the computerized device by adding an additional element or step to the login procedure.

Another embodiment of the invention relates to a computerized device having at least one communications interface, a controller, and an interconnection mechanism coupling the at least one communications interface and the controller. The computerized device is configured to monitor a configuration state of the computerized device, provide a first login query, provide configuration state information in response to receiving a login entry from the first login query where the configuration state information indicates the configuration state of the computerized device and provide a second login query in response to receiving the login entry from the first login query.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a controller such as a memory (e.g., any type of computer readable medium, storage or memory system) and a processor, and an interconnection mechanism connecting the communications interface and the controller. In such embodiments, the memory system is encoded with a configuration state application that when performed on the processor, produces a configuration state process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a configuration state manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general-purpose electronic device to cause such a device to perform the techniques explained herein as embodiments of the invention.

The embodiments of the invention may be implemented by computer software and/or hardware mechanisms within a computerized device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

A controller of the computerized device maintains a record of the hardware or software configuration of the computerized device. The controller records, within a storage location, any detectable attachments or detachments of peripheral devices relative to the computerized device. The controller reports the detected attachments or detachments to the user to indicate the possibility of the occurrence of a computerized device attack. The controller also provides a two-level login procedure for the computerized device. The controller provides a first login query to a user for a password and, upon reception of a successful first login response, the controller displays a warning screen that indicates a change in the configuration of the computerized device. For example, the warning screen can indicate whether the controller has detected any change to the hardware or software configuration of the computer since the user's last session, what the detected changes were, the time of the change, and when, if ever, the peripheral attachment or detachment detection circuitry and logic were unable to perform their monitoring because of a loss of power to the computerized device. The controller then provides a second login query for a password to the user. At this point, the user can consider whether to risk continuing through the second-level login procedure, depending upon the information contained within the warning screen. The two-level login scheme ensures that the user's high-security credentials are not presented to the operating system, thereby running the risk of password capture by keystroke-archival devices, for example, until after the user has had the opportunity to be warned of detected configuration changes with respect to the computerized device.

Figure 1:
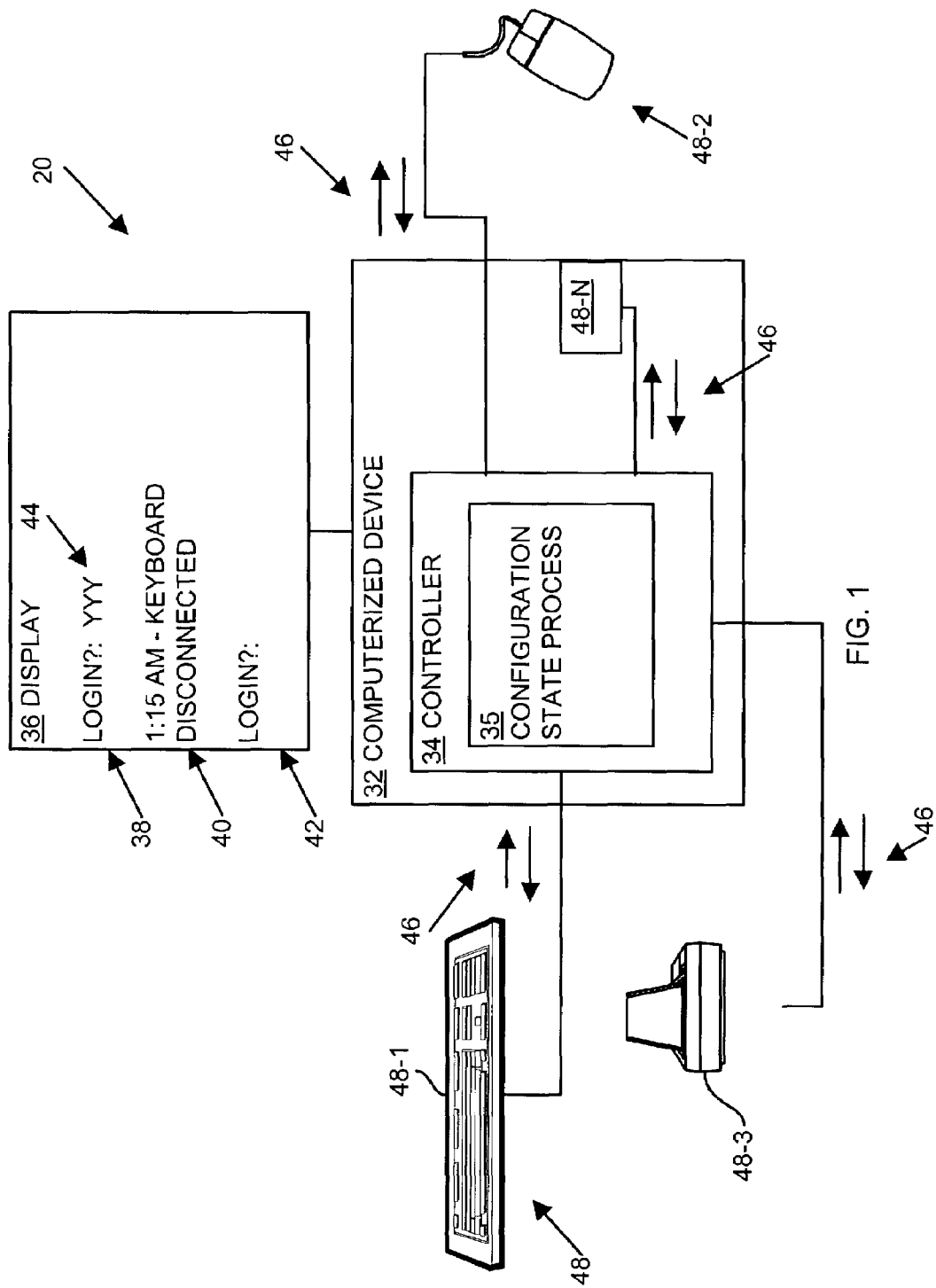
FIG. 1 is a block diagram of a computerized device, configured according to one embodiment of the invention.

FIG. 1 illustrates a computerized system 20, according to one embodiment of the invention. The system 20 includes a computerized device 32, a display 36 in communication with the computerized device 32, and at least one peripheral component 48 associated with the computerized device 32.

The computerized device 32, for example, is an individual computing device such as a router, switch, appliance, server, desktop computer (e.g., personal computer), or laptop computer. The computerized device 32 has a controller 34 that performs a configuration state process 35. When the controller 34 performs the configuration state process 35, the controller 34 monitors 46 the configuration state (e.g., hardware or software configuration) of the system 20 and detects a variance of the configuration state within the system 20. In one embodiment, the controller 34 includes a memory, or storage location, and a processor.

The peripheral component or device 48 can be located either externally or internally relative to the computerized device 32. For example, peripheral devices 48 located external to the computerized device 32 include a keyboard 48-1, a mouse 48-2, or a printer 48-3. Such devices 48-1, 48-2, and 48-3 are removeably attached to the computerized device 32. The peripheral device 48-N, located within the computerized device 32 includes hardware, such as a daughter card, a memory module, or a disk drive, or software, such as a device driver or kernel module.

Figure 2:
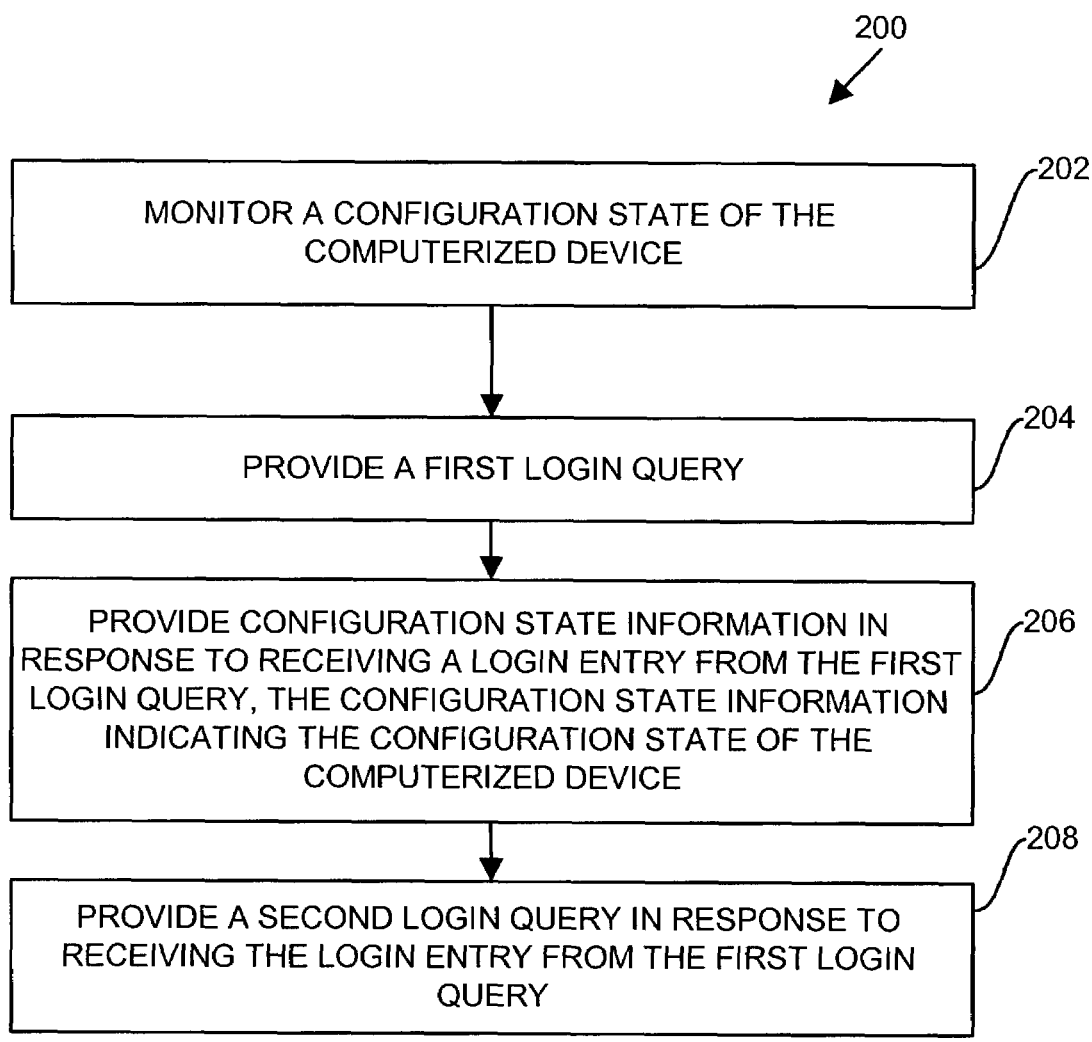
FIG. 2 is a flowchart of a procedure performed by the computerized device of FIG. 1, configured according to one embodiment of the invention.

FIG. 2 illustrates a flowchart showing a method performed within the system 20, according to one embodiment of the invention. The method provides security to the computerized device 32 by detecting changes with respect to the configuration of the computerized device 32 and reporting the changes to a user before the user logs into the device 32.

In step 202, the controller 34 monitors 46 a configuration state of the computerized device 32. The configuration state of the computerized device relates to the presence or absence of particular peripheral components or devices 48 associated with the computerized device 32. For example, with respect to FIG. 1, the configuration state of the system 20 indicates the presence of the keyboard 48-1, the mouse 48-2, the printer 48-3, and the internally located peripheral component 48-N relative to the computerized device 32. As the controller 34 monitors 46 the configuration state of the computerized device 32, the controller 34 detects the addition, removal, or replacement of any of the peripheral devices 48 relative to the computerized device 32, thereby indicating potential tampering of the computer system 20.

In one embodiment, when the controller 34 monitors 46 the configuration state of the computerized device 32, the controller 34 monitors an attachment event for a peripheral component 48 associated with the computerized device 32. The attachment event of a peripheral component 48 includes either the removal or attachment of a peripheral component 48 to the computerized device 32. When the controller detects the presence of an attachment event, the controller 34 stores the result of the detection as configuration state information within a storage location associated with the controller for later access or retrieval.

When a peripheral component 48 undergoes an attachment event relative to the computerized device 32, in another embodiment, the controller 34 monitors a peripheral component identity associated with the peripheral component 48. By monitoring the peripheral component identity, such as the model number or serial number of the peripheral component 48, the controller 34 can detect replacement of the particular peripheral component 48 with a substitute component 48. For example, assume a user removes the keyboard 48-1 from the computerized device 32 and replaces the keyboard 48-1 with a similar, modified keyboard 48 (e.g., modified with a keystroke-archive module). During the monitoring process, the controller 34 detects a difference between either the model number or serial number of the replacement keyboard 48 and the model number or serial number of the original keyboard 48-1. In one arrangement, the controller 34 stores the peripheral component identity associated with the peripheral component 48 within a storage location as a basis for comparison against the monitored peripheral component identity.

When the peripheral component 48 undergoes the attachment event, in another embodiment, the controller 34 monitors a time associated with the attachment event for the peripheral component 48. By monitoring the time associated with the attachment event, the controller 34 allows the user to determine when the potential security violation has occurred with respect to his computerized device 32, thereby allowing the user to determine potential suspects for the violation of the computerized device 32. In one arrangement, the controller 34 stores the time associated with the attachment event within a storage location for later reporting to a user of the computerized device 32.

In another embodiment, when the controller 34 monitors 46 the configuration state of the computerized device 32, the controller 34 detects a loss of power in the computerized device 32 and detects a time associated with the loss of power for the computerized device 32. For example, when the computerized device 32 experiences an external power outage and switches to a backup power source (e.g. battery), the controller 34 detects the switch between the power sources as an indication of loss of power. In the case where the computerized device 32 does not receive power for some period of time, security of the computerized device 32 can be compromised (e.g., a peripheral component 48 removed and replaced with the addition of a keystroke-archive module). For example, during a power outage, an infiltrator can remove or attach components to the computerized device 32 without detection, thereby allowing the infiltrator to gain access to information stored on or associated with the computerized device 32. By detecting both loss of power and the time associated with the loss of power for the computerized device 32, the controller 34 can store this information within a storage location later provide the information to the user the computerized device 32, thereby warning the user over potential breach in the security of the computerized device 32.

In another embodiment, the controller 34 monitors 46 the configuration state of the computerized device 32 during a time period between a logout event and a login event. By monitoring 46 the configuration state of the computerized device 32 during this time period, the controller 34 can detect any changes to the configuration state of the computerized device 32 during a period when the user has no contact with the computerized device 32. For example, assume in a user logs out of the computerized device 32 at 5 PM on a Monday (e.g., logout event) and logs in to the computer at 9 AM on the following Tuesday (e.g., login event). The controller 34 monitors 46 the configuration state of the computerized device 32 between 5 PM Monday and 9 AM Tuesday, the time period when the user (e.g., the authorized user) is not present at the computerized device 32 or is not in contact with the computerized device 32.

In another embodiment, the controller 34 monitors 46 the configuration state of the computerized device 32 at a periodic interval. For example, in one embodiment, the controller 34 detects or monitors 46 the configuration state of the computerized device 32 once every thirty seconds during a time period of 10 hours. The more often the controller 34 monitors the configuration state of the computerized device 32 (e.g., the greater the frequency of the periodic monitoring interval), the greater the controller's 34 ability to detect a breach in the security or a change in the configuration state of the computerized device 32.

In step 204, the controller 34 provides a first login query 38 to a user. The login query 38 is a request for a user's password or identification number, for example. In one embodiment, the controller 34 transmits the login query 38 to the display 36 for display to the user. When the user inputs or enters, with the computerized device 32, a login entry 44 such as a password or identification number that corresponds to an identification number associated with the computerized device (e.g., stored within a database), the computerized device 32 provides the user access to data associated with the computerized device 32.

In step 206, the controller 34 provides configuration state information 45 in response to receiving the login entry 44 as a response to the first login query 38. The configuration state information 45 indicates the configuration state of the computerized device 32 such as changes regarding the peripheral components 48 (e.g., attachment or detachment) relative to the computerized device 32, thereby indicating a potential breach in the security of the computerized device 32. In one embodiment, the configuration state information 45 includes information relating to changes in the hardware or software configuration of the computerized device 32 detected since the user's last session, the type of changes detected, the time and date of the last detected change, and when, if ever, the controller 34 was unable to monitor the configuration state of the computerized device because of a loss of power to the computerized device. For example, as illustrated in FIG. 1, the configuration state information 45 indicates the configuration state of the computerized device 32 (e.g., keyboard disconnected) and the time associated with the configuration state of the computerized device 32 (e.g., 1:15 AM).

In step 208, the controller 34 provides a second login query 42 in response to receiving the login entry 44 from the first login query 38. By providing the second login query 42, the controller 34 allows the user to consider whether or not to continue through the second level logging procedure based upon the displayed configuration state information 45. For example, as illustrated in FIG. 1, the controller 34 indicates, through the notification 40 to the user, that the keyboard 48-1 was disconnected from the computerized device 32 at 1:15 AM. The controller 34 also provides the second login query 42. Prior to responding to the second login query 38, the user can examine the computerized device 32 to determine or detect the presence of physical tampering. If the user detects a physical attack (e.g., the presence of a keystroke-archive module), the user can take some action (e.g., remove the a keystroke-archive module) prior to continuing with the login procedure. The two-level login procedure, therefore, provides an element of security for the computerized device 32 with respect to a physical attack, for example.

As stated above, the controller 34 monitors 46 the configuration state of the computerized device 32 and provides configuration state information 45, relating to the configuration state, to the user. The controller 34 can perform the process of monitoring in several different ways.

Figure 3:
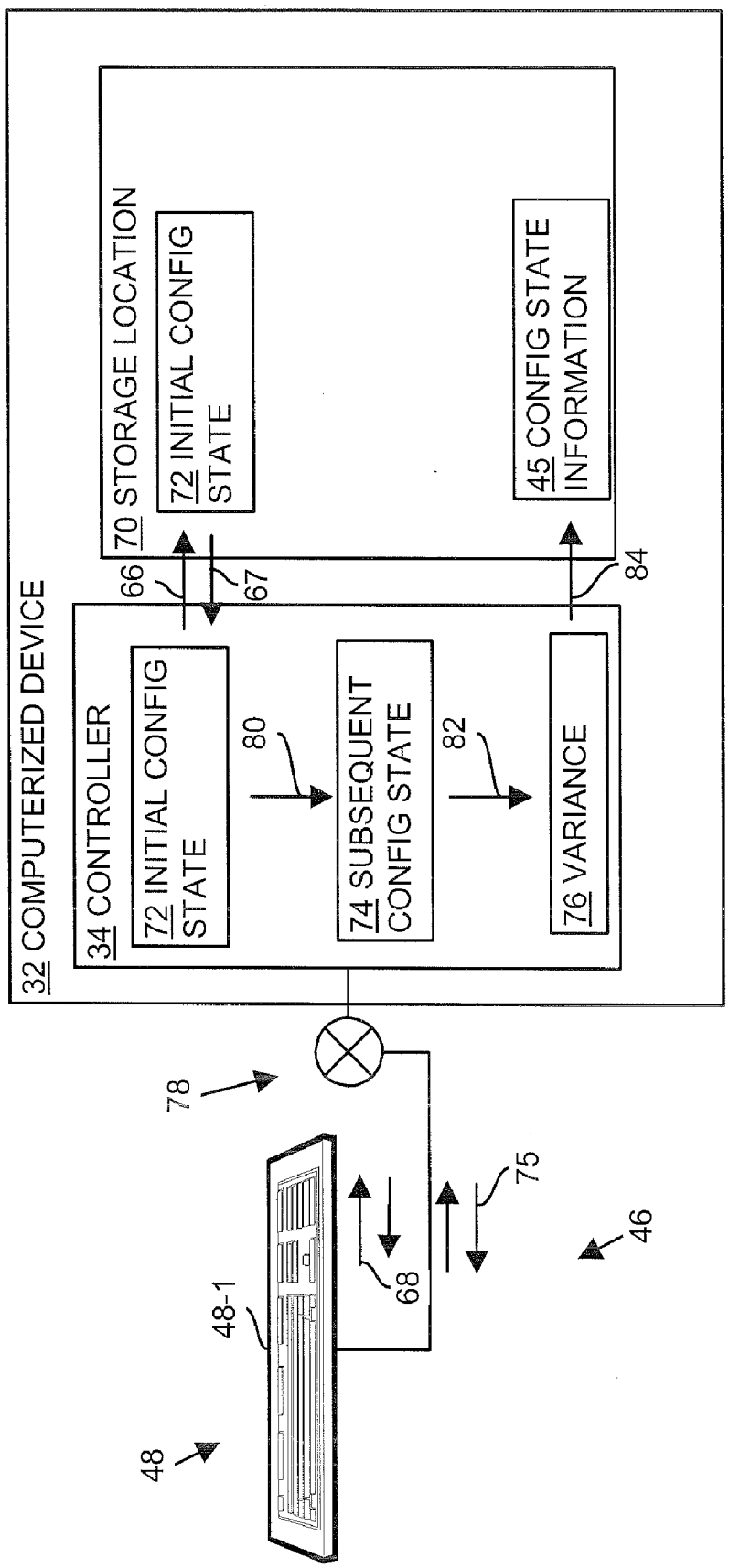
FIG. 3 is a block diagram of a computerized device, configured according to one embodiment of the invention.

FIG. 3 illustrates the controller 34 monitoring 46 the configuration state of the computerized device 32 according to one embodiment.

In one embodiment, when monitoring 46 the configuration state of the computerized device 32, the controller 34 retrieves 68 an initial configuration state 72 of the computerized device 32. The initial configuration state 72 of the computerized device 32 relates to the presence of peripheral devices 48 associated with the computerized device 32. For example, as shown in FIG. 3, the peripheral device 48 is a keyboard 48-1 and the controller 34 detects the presence of the keyboard 48-1 relative to the computerized device 32 (e.g., determines that the keyboard 48-1 is connected to the computerized device).

In one embodiment, the controller 34 detects the presence of the peripheral device 48 relative to the computerized device 32 based upon the presence of a signal loop formed between the controller 34 and the peripheral component 48. For example, the controller 34 can transmit a test signal to a target peripheral component 48. When the controller 34 receives a signal from the target peripheral device 48 in response to the test signal, the response signal indicates the association between the target peripheral device 48 and the computerized device 32. When the controller 34 does not receive a signal in response to the test signal, the non-reception condition indicates no association between the target peripheral device 48 and the computerized device 32.

The controller 34 stores 67 the initial configuration state 72 within a storage location 70 associated with the computerized device 32. In one embodiment the storage location 70 is a secure storage location. For example, the storage location 70 is a secure time stamped tamper-proof memory buffer embedded within the controller 34 of the computerized device 32 (e.g., such as the iButton from Dallas Semiconductor, Dallas, Tex.). Use of the secure storage location 70 prevents an unauthorized user from gaining access to information stored within the storage location. The storage location 70, in another embodiment, is a computer memory or a magnetic storage medium (e.g., hard drive).

When monitoring 46 the configuration state of the computerized device 32, the controller 34 also monitors 75 a subsequent configuration state 74 of the computerized device 32. The subsequent configuration state 74 of the computerized device 32 relates to the configuration state of the computerized device 32 after the occurrence of a particular event, such as a logout event.

In order to determine the configuration state of the computerized device 32 over a given period of time (e.g., from logout to login), the controller 34 compares 80 the initial configuration state 72 of the computerized device 32 with the subsequent configuration state 74 of the computerized device 32. The controller detects 82 any differences between the initial configuration state 72 and the subsequent configuration state 74 as a variance 76 in the configuration state of the computerized device 32. In one embodiment, prior to comparing 80 the initial configuration state 72 and the subsequent configuration state 74, the controller 34 retrieves 67 the initial configuration state 72 from the storage location 70.

In one embodiment, while monitoring 75 the subsequence configuration state 74 of the computerized device 32, the controller 34 can detect an attachment event 78 (e.g. attachment or detachment of peripheral components 48) relative to a peripheral component 48 associated with the computerized device 32. For example, as described above, the controller 34 detects the presence of the peripheral device 48 relative to the computerized device 32 based upon the presence of a signal loop formed between the controller 34 and the peripheral component 48. In the embodiment illustrated in FIG. 3, when the controller 34 transmits a test signal to the keyboard 48-1, as part of monitoring the subsequent configuration state 74, and the keyboard has been disconnected 78 from the computerized device 32 (e.g., the presence of the keyboard 48-1 recorder in the initial configuration state 72), the controller 34 does not receive a return signal, thereby indicating the detachment of the keyboard 48-1 from the computerized device 32. The controller 34 records the absence of the keyboard 48-1 as data within the subsequent configuration state 74 for comparison against the initial configuration state 72. In this embodiment of FIG. 3, when the controller 34 compares 80 the initial configuration state 72 with the subsequent configuration state 74, the controller 34 detects 82 a variance 74 between the states 72,74 (e.g., attached keyboard 48-1 versus non-attached keyboard 48-1) and reports the variance 74 as configuration state information 45 to a user.

In one embodiment, the controller 34 stores 84 configuration state information 45 relating to the configuration state of the computerized device 32 within the storage location 70. For example, the controller 34 stores the configuration state information 45 within a tamper-proof storage location, such as a smart card (e.g., iButton, Dallas Semiconductor, Dallas, Tex.). The controller 34 stores 84 the configuration state information 45 in the storage location 70 to allow retrieval of the information 45 a later time, such as after receiving a login entry 44 form a user.

The configuration state information 45 contains the variance 76 detected 82 by the controller 34. For example, if the controller 34 detects the absence of an earlier-present keyboard 48-1 as the variance 76 of the computerized device 32, the controller 34 can store the variance 76 as a "keyboard disconnected" message as part of the configuration state information 45. Alternately, when the controller 34 does not detect 82 a variance 76 between the initial configuration state 72 and the subsequent configuration state 74, the controller can store a "status quo" message as part of the configuration state information 45.

As outlined above, the controller 34 detects the presence or absence of a peripheral component 48 associated with the computerized device 32 based upon an attachment event 78. The possibility exists, however, that an unauthorized user can detach the peripheral device 48 from the computerized device 32 at a time when the controller 34 is not monitoring 68 the subsequent configuration state 74 of the computerized device 32 and replace the peripheral component 48 with a modified, duplicate component. For example, the modified component can be configured to store or transmit keystrokes from the keyboard 48-1, thereby allowing an unauthorized user the ability to retrieve particular keystrokes (e.g., login password keystrokes) and access the computerized device 32 at a later time.

Figure 4:
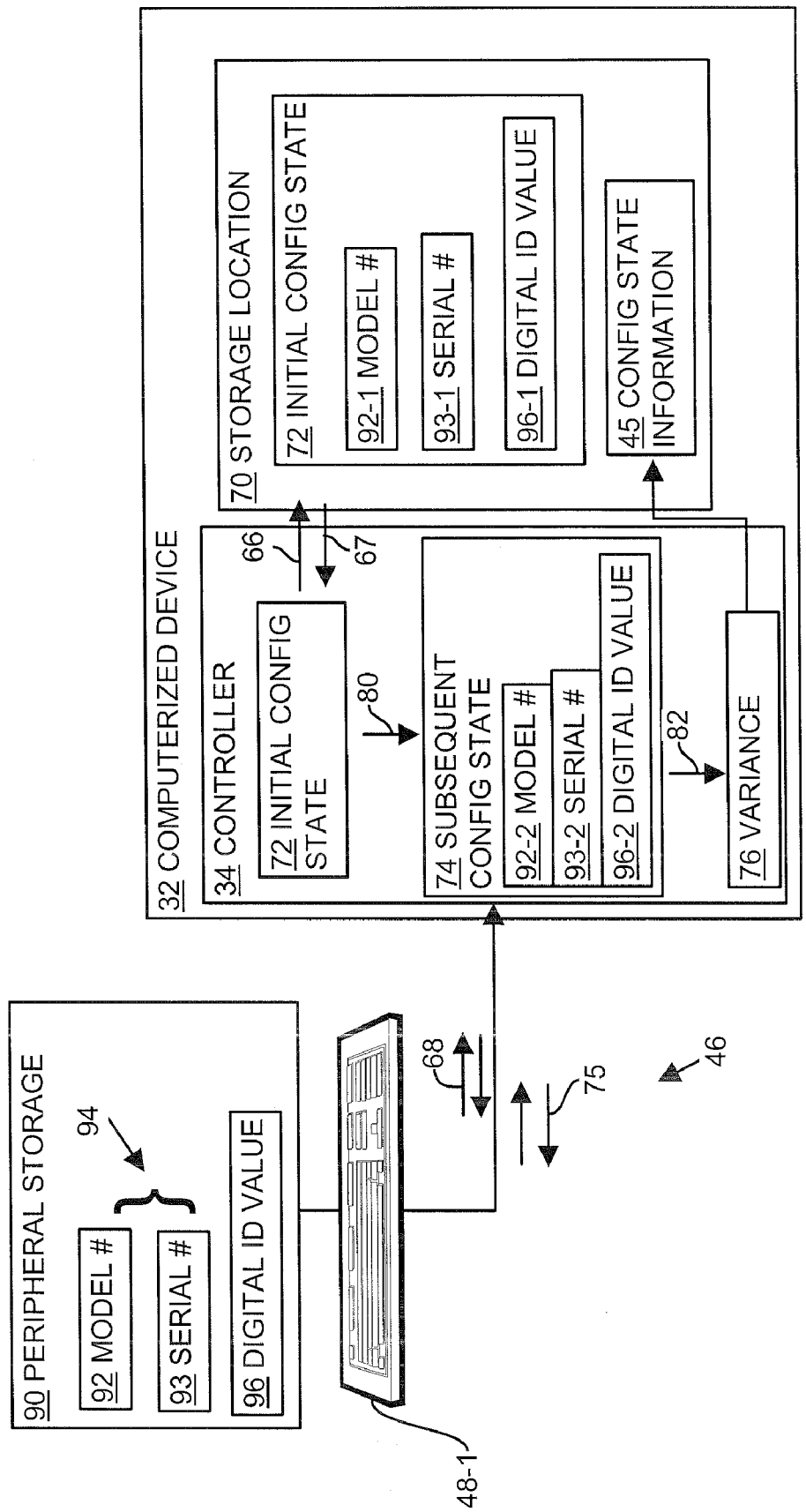
FIG. 4 is a block diagram of a computerized device, configured according to one embodiment of the invention.

FIG. 4 illustrates the controller 34 monitoring 46 the configuration state of the computerized device 32 according to another embodiment.

As shown in FIG. 4, the peripheral component 48 associated with the computerized device 32 includes a peripheral storage location 90 having electronically readable identification data 94. In one embodiment, the peripheral storage location 90 is a secure, tamper-proof memory, associated with the peripheral component 48 while the identification data 94 includes a model number 92 and a serial number 93 associated with the peripheral component 48. By comparing the identification data 94 of the peripheral device, obtained during monitoring of the subsequent configuration state 74, with the identification data 94, obtained during monitoring of the initial configuration state 72, the controller 34 can determine whether the peripheral device 48 has been replaced with a replacement peripheral device, thereby indicating the possibility of a hardware attack to the computerized device 32.

For example, in one embodiment, during monitoring 68 of the initial configuration state 72 of the computerized device 32, the controller 34 retrieves 74 the model number 92-1 and serial number 93-1 (e.g., identification data 94-1) from the peripheral storage location 90 of the keyboard 48-1. The controller 34 then stores 66 the model number 92-1 and serial number 93-1 within the storage location 70 associated with the controller as part of the initial configuration state 72 of the computerized device 32.

When monitoring 75 the subsequent configuration state 74 of the computerized device 32 (e.g., after a user has logged out of the computerized device 32), the controller 34 retrieves model number 92-2 and serial number 93-2 from the keyboard 48-1. The controller 34 associates the model number 92-2 and serial number 93-2 with the subsequent configuration state 74 of the computerized device 32. When the controller 34 compares the initial configuration state 72 with the subsequent configuration state, the controller 34 compares the model number 92-2 and serial number 93-2 of the subsequent configuration state 74 with the model number 92-1 and serial number 93-1 of the initial configuration state 72. From this comparison, the controller 34 can detect 82 the presence of a variance 76 between the identification data 94 stored in the initial configuration state 72 and the identification data 94 stored or logged in the subsequent configuration state 74. When an unauthorized user replaces the keyboard 48-1 with a modified keyboard (e.g., modified to store keystroke information as input by the user), the model number 92 and serial number 93 associated with the modified keyboard is not the same as that of the first keyboard 48-1. Therefore, in comparing the initial configuration state 72 of the computerized device with the subsequence configuration state 74, the controller 34 can detect 82 a variance 76 (e.g., mismatch) in the respective, associated identification information 94 of the states 72, 74. In turn, the controller 34 stores the variance 76 part of the configuration state information 45 of the computerized device 32.

In another embodiment, the peripheral storage 90 of the peripheral device 48 also includes a digitally signed identification value 96. The manufacturer of the peripheral device assigns the digitally signed identification value 96 to the peripheral device 48 based upon a public-key-based signature scheme. The digitally signed identification value 96 allows the controller 34 to conduct a challenge-response protocol with the peripheral device 48 to verify the identity of the peripheral device 48. During the challenge-response protocol, the controller 34 requests the peripheral device 48 to provide the digitally signed identification value 96, such as a certificate, to validate the identity of the peripheral device 48.

For example, assume that the controller 34 is configured to include the digital identification values 96 for all of the peripheral devices associated with the computerized device 32. In one embodiment, the digital identification value 96-1 is associated with the initial configuration state 72 of the computerized device 32. When the controller 34 monitors the subsequent configuration state 74 of the computerized device 32, the controller 34 requests a digitally signed identification value 96-2 from the peripheral component 48 (e.g., the controller 34 performs the challenge portion of the challenge response protocol). After receiving the digitally signed identification value 96-2 from the peripheral storage 90 associated with the peripheral component 48, the controller 34 compares the received digitally signed identification value 96-2 with the stored digitally signed identification value 96-1. In the case where a user replaces the peripheral device 48 with a device 48 having a digital identification value 96 that differs from the value 96 associated with the computerized device 32, the controller 34 can detect 82 a variance 76 between the initial configuration state 72 and the subsequent configuration state.

The storage location 70 associated with the controller 34 stores 66 the initial configuration state 72 of the computerized device 32. As described, the storage location 70 is located within the computerized device 32. In an alternate embodiment, the controller 34 stores initial configuration information 72 in a storage location 70 external to the computerized device 32, thereby allowing removal or disassociation of the storage location 70 from the computerized device 32 and guarding against a storage device replacement attack, for example.

Figure 5:
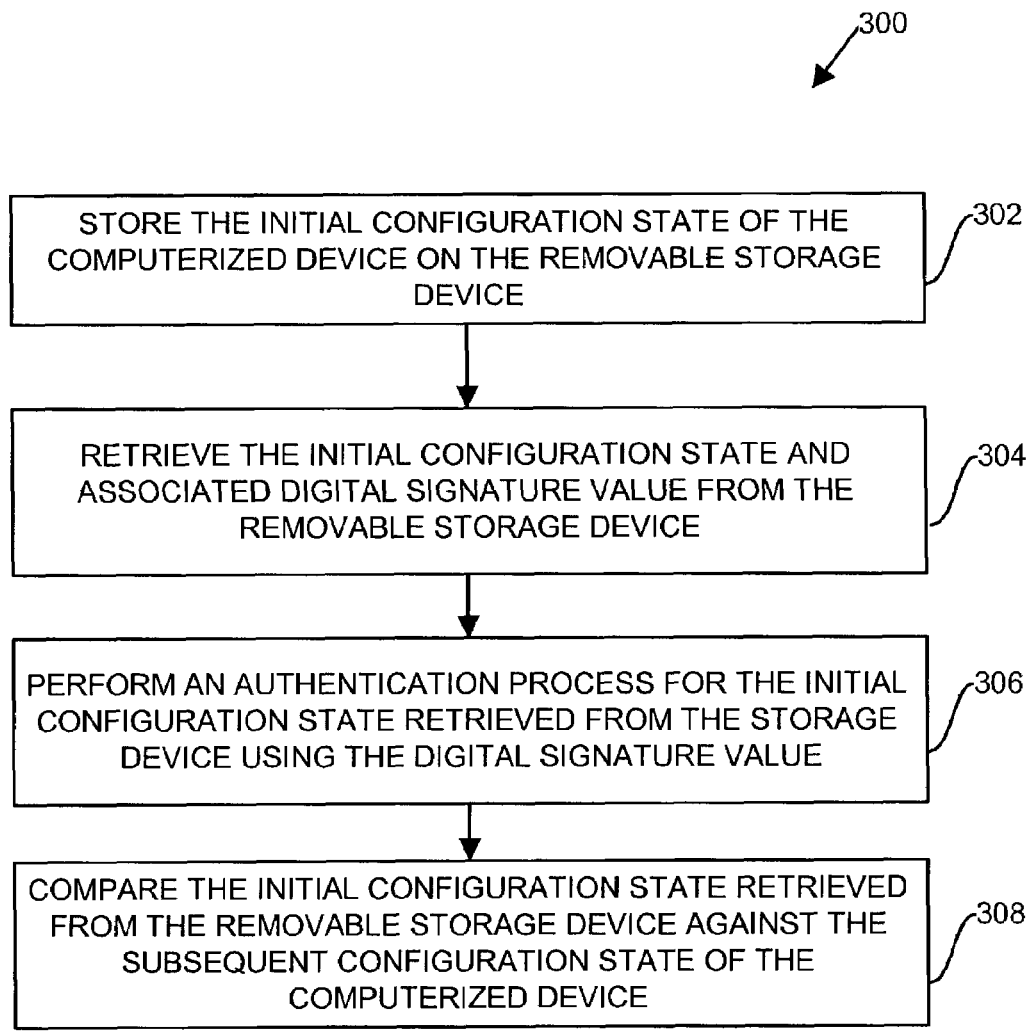
FIG. 5 is a flowchart of a procedure performed by the data communications system of FIG. 1, configured according to one embodiment of the invention.

FIG. 5 illustrates a flowchart showing a method 300 that allows a user to login to the computerized device 32 having a removable storage device 70, in one embodiment. The removable storage device 70, in this embodiment, is a compact flash card, memory stick, floppy disk, or zip disk, for example. Such a removable storage device 70 includes a processor that can perform error checking to validate read and write requests with respect to the storage device 70, for example, but does not implement conditional access to the storage device 70 based upon manual, electronic, or cryptographic authorizations.

In step 302, the controller 34 stores the initial configuration state 72 of the computerized device 32 on the removable storage device 70. In one embodiment, the controller 34 stores the initial configuration state 72 along with a digital signature value associated with the initial configuration state 72. The controller 34 uses the digital signature value at a later time (e.g., during login after removal and reattachment of the removable storage device 70) to assure the integrity of the initial configuration state 72 of the computerized device 32.

In one embodiment, the controller 34 stores the initial configuration state 72 of the computerized device 32 onto the removable storage device 70 prior to the user logging out of the computerized device. By storing the configuration state information 72 of the computerized device 32 prior to logout, the controller 34 records the most recent configuration state of the computerized device 32 (e.g., the configuration state of the computerized device 32 as last used by the user) within the storage device 70. In an alternate embodiment, the controller 34 stores the initial configuration state information 72 of the computerized device 32 onto the removable storage device 70 prior to the user logging in to the computerized device 32 (e.g., after the user both reattaches the storage device 70 to the computerized device and proceeds through the second login query 42). In this manner, the controller 34 also records the most recent configuration state of the computerized device 32 (e.g., the configuration state of the computerized device 32 as last used by the user). For example, prior to presenting a second login query 42 to the user during a login procedure, the controller 34 can present a request to the user for authorization to update the removable storage device 70 with the current initial configuration state 72 of the computerized device 32.

After the controller 34 stores the initial configuration state 74 of the computerized device 32 on the storage device 70, the user can disassociate or remove the storage device 70 from the computerized device 32, thereby guarding against a storage device replacement attack. At some later time, in order to login to the computerized device 32, the user replaces or reattaches the removable storage device 70 with the computerized device 32.

In step 304, the controller 34 retrieves the initial configuration state 74 and associated digital signature value from the removable storage device 70. In one embodiment, the controller 34 retrieves the initial configuration state 72 from the removable storage device 70 after providing the first login query 38 to the user and receiving a login entry 44, such as a password.

In step 306, the controller 34 performs an authentication process for the initial configuration state 74 retrieved from the storage device 70 using the digital signature value. In one embodiment, using the digital signature value recorded with the initial configuration state 72, the controller 34 performs a cryptographic calculation to verify the integrity of the configuration state information 74 retrieved from the removable storage device 70. If the controller detects that the integrity of the initial configuration state information 74 has been violated, the controller 34 can provide a warning 40 to the user indicating that the integrity of the configuration state information 74 cannot be verified.

In step 308, after verifying the integrity of the configuration state information 74, the controller 34 compares the initial configuration state 72 retrieved from the removable storage device 70 against the subsequent configuration state 74 of the computerized device 32, as detected by the controller 34. The controller 34 reports 40 any discrepancies between the initial configuration state 72 and the subsequent configuration state 74 to the user. Therefore, the user can review the warning 40 and, based upon the warning, decide whether or not to proceed with the login procedure.

Figure 6:
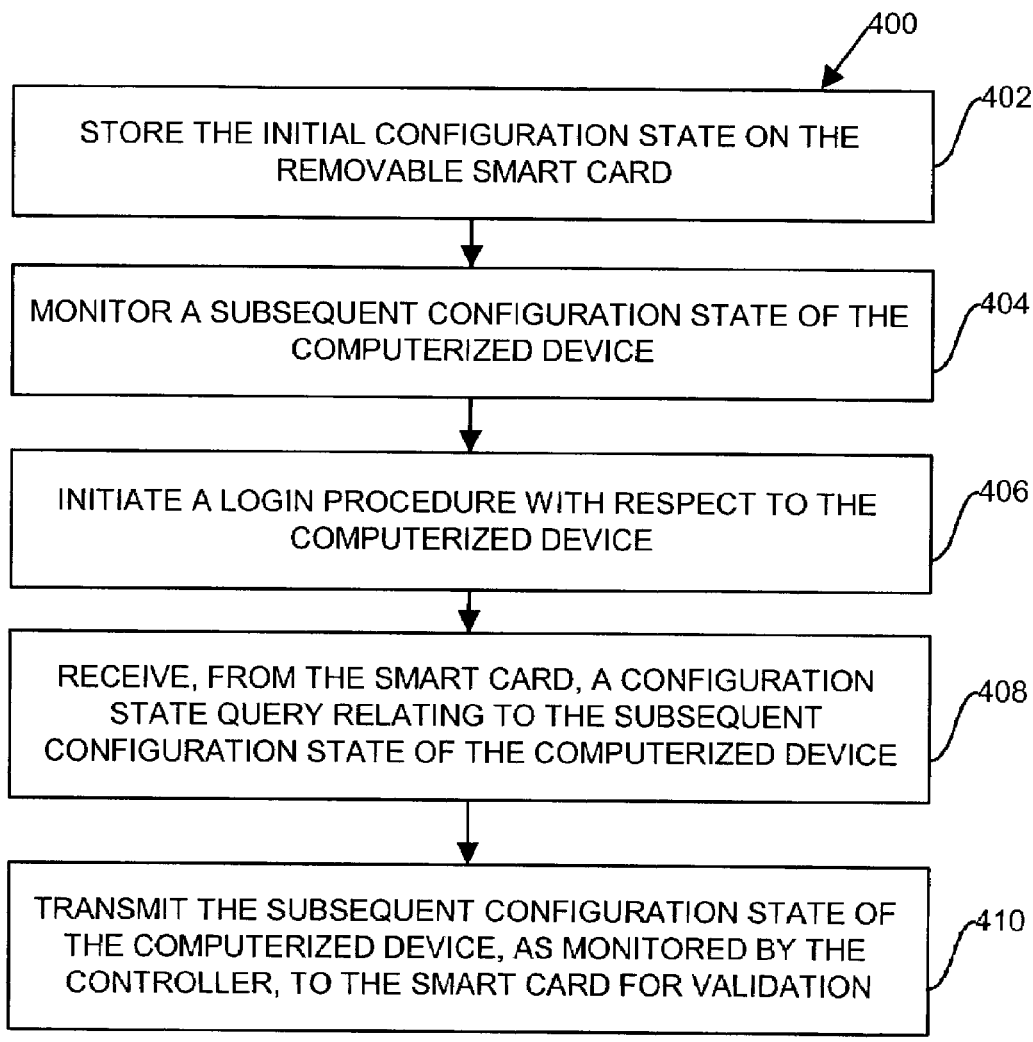
FIG. 6 is a flowchart of a procedure performed by the data communications system of FIG. 1, configured according to one embodiment of the invention.

FIG. 6 illustrates another flowchart showing a method 400 that allows a user to login to the computerized device 32 using a removable storage device 70, in another embodiment. The removable storage device 70, in this embodiment, is a removable storage device having an embedded tamperproof memory and processor (e.g., a smart card 70), for example. The processor of such a removable storage device 70 allows conditional access to the memory of the storage device 70 based upon manual, electronic, or cryptographic authorizations. The smart card 70 provides a user the ability to carry a secure copy of the valid configuration state (e.g., initial configuration state 72) of the computerized device 32 and present the configuration state information 72 to the processor 34 during the login process.

In step 402, the controller 34 stores the initial configuration state 72 on the removable smart card 70. The controller 34 can store the initial configuration state 72 of the computerized device 32 either prior to the user logging out of the computerized device 32 or prior to the user logging into the computerized device 32.

In one embodiment, the controller 34 stores the initial configuration state 72 of the computerized device 32 onto the smart card 70 prior to the user logging out of the computerized device. By storing the configuration state information 72 of the computerized device 32 at this time, the controller 34 records the most recent configuration state of the computerized device 32 (e.g., the configuration state of the computerized device 32 as last used by the user) within the storage device 70. In an alternate embodiment, the controller 34 stores the initial configuration state information 72 of the computerized device 32 onto the removable storage device 70 prior to the user logging into the computerized device 32 (e.g., after the user proceeds through the second login query 42). For example, during a login procedure, prior to presenting the second login query 42 to the user, the controller 34 can present a request to the user for authorization to update the smart card 70 with the current initial configuration state 72 of the computerized device 32. In one embodiment, the user authorizes the update of the initial configuration state 72 by entering a code or engaging a button (e.g., actuator) on the smart card 70.

After the controller 34 stores the initial configuration state 74 of the computerized device 32 on the smart card 70, the user can disassociate or remove the storage device 70 from the computerized device 32. At some later time, in order to login to the computerized device 32, the user replaces or reattaches the smart card 70 with the computerized device 32.

In step 404, the controller 34 monitors a subsequent configuration state 74 of the computerized device 32. As described above, the subsequent configuration state 74 of the computerized device 32 relates to the configuration state of the computerized device 32 after the occurrence of a particular event, such as a logout event. For example, prior to a user removing the smart card 70 from the computerized device 32, the user logs out of the computerized device 32. This logout event triggers the controller to monitor the subsequent configuration state 74 of the computerized device 32.

In step 406, the controller 34 initiates a login procedure with respect to the computerized device 32. For example, prior to entering the login procedure, the user presents the smart card 70 to the computerized device 32. Presenting the smart card 70 to the computerized device 32 triggers the controller 34 to begin the login procedure. The controller 34 initiates the login procedure by providing a first login query 38 to the user and receiving a login entry 44, such as a password, that provides the user access to the computerized device 32.

In step 408, the controller 34 receives, from the smart card 70, a configuration state query relating to the subsequent configuration state 74 of the computerized device 32. In this manner, the smart card 70 initiates an authentication procedure regarding the configuration state of the computerized device 32.

In step 410, the controller 34 transmits the subsequent configuration state 74 of the computerized device 32, as monitored by the controller 34, to the smart card 70 for validation. In one embodiment, the controller 34 transmits the subsequent configuration state 74 of the computerized device 32 in a digitally signed configuration. During validation, the smart card 70 performs a comparison of the subsequent configuration state 74 of the computerized device 32 with the initial configuration state 72 stored on the smart card 70 to detect changes in the configuration state of the computerized device 32. The smart card 70 reports any discrepancies between the initial configuration state 72 and the subsequent configuration state 74 to the user as a warning 40. The controller 34 proceeds with the login process and presents the second login query 38 to the user.

Figure 7:
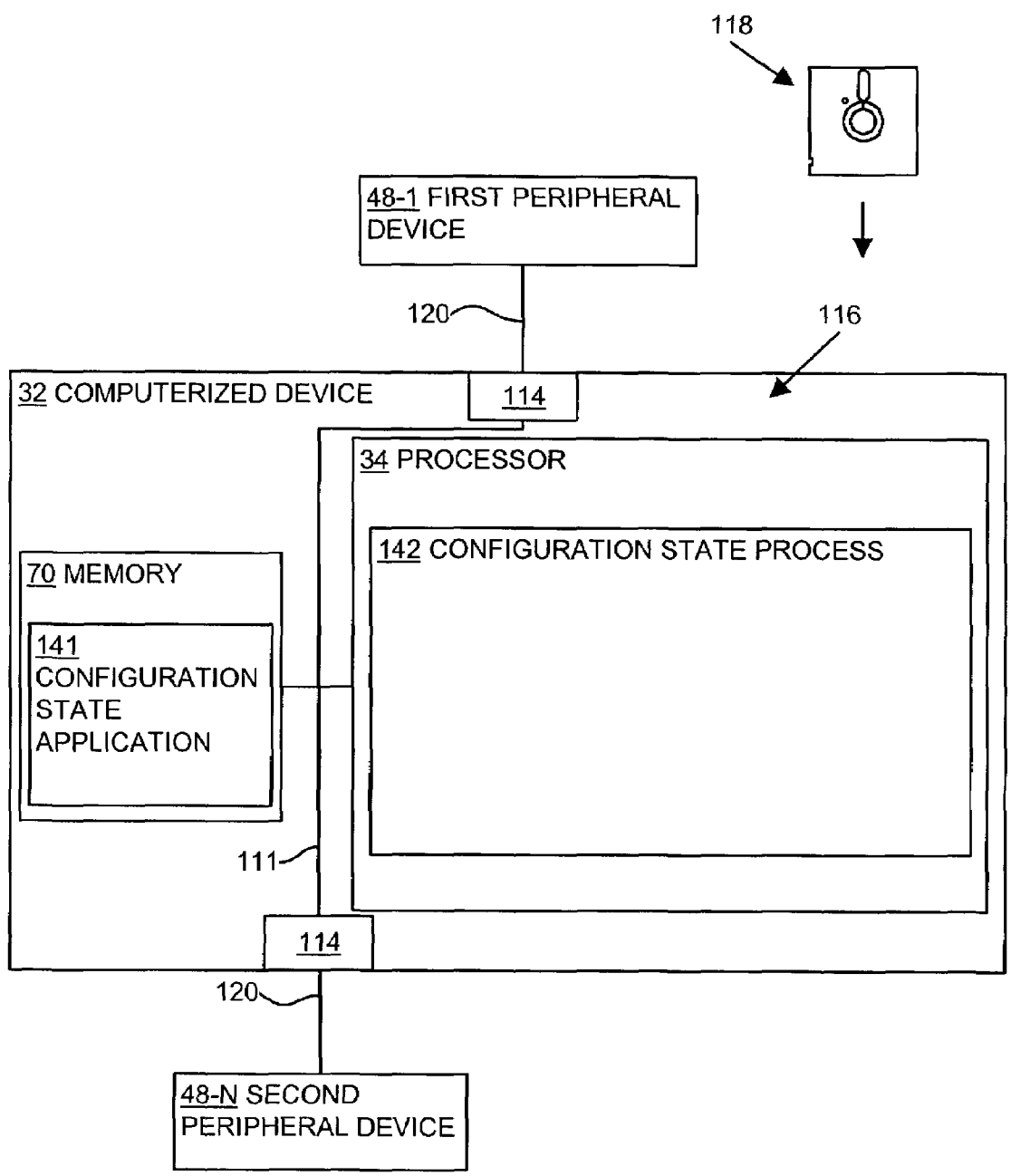
FIG. 7 is a block diagram of a block diagram of a computerized device, configured according to one embodiment of the invention.

FIG. 7 illustrates a more detailed architecture of a computerized device 32 configured according to one embodiment of the invention. A computer program product 118 includes an application or logic instructions, such as configuration state instructions, that are loaded into the computerized device 32 to configure the computerized device 32 to monitor the configuration state of the system 20.

The computerized device 32 in this example embodiment of the invention includes an interconnection mechanism 111 such as a data bus and/or other circuitry that interconnects a controller 116, such as a memory 70 and a processor 34 with one or more communications interfaces 114.

The memory 70 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 70 is encoded with logic instructions (e.g., software code) and/or data that form a configuration state application 141 configured according to embodiments of the invention. In other words, the configuration state application 141 represents software code, instructions and/or data that represent or convey the processing logic steps and operations as explained herein and that reside within memory or storage or within any computer readable medium accessible to the computerized device 32.

The processor 34 represents any type of circuitry or processing device such as a central processing unit, microprocessor or application-specific integrated circuit that can access the configuration state application 141 encoded within the memory 70 over the interconnection mechanism 111 in order to execute, run, interpret, operate or otherwise perform the configuration state application 141 logic instructions. Doing so forms the configuration state process 142. In other words, the configuration state process 142 represents one or more portions of the logic instructions of the configuration state application 141 while being executed or otherwise performed on, by, or in the processor 34 within the computerized device 32. The controller 34 in FIG. 1 represents either one or both of the configuration state application 141 and the configuration state process 142.

Those skilled in the art will understand that there can be many variations made to the embodiments explained above while still achieving the same objective of those embodiments and the invention in general.

In one example, the circuitry or memory used by the controller 34 to record or store configuration state information 45 has a finite capacity. In order to prevent the storage location 70 (e.g., memory) from reaching maximum capacity, a user can periodically purge the storage location of configuration state information 45 on a periodic basis. In one embodiment, the controller 34 provides a warning, such as a specification of the last time the finite buffer was filled and how much data was written prior to that time, to allow the user to purge the memory.

As described above, the controller 34 provides a two-level login procedure to provide security to the computerized device. However, the controller 34 can provide additional levels of logins. For example, the controller 34 can provide a third-level of authorization (e.g., three-level login). In one embodiment, the third-level login is not available to a user of the computerized device but is available to an authorized administrative user. The third-level login allows an administrative user to log into the computerized device to perform an administrative task, such as resetting the event log (e.g., configuration state information 45) or setting an initial configuration state 72 of the computerized device 32.

In another example, as illustrated in FIG. 1, the second login query 42 is a request for a login entry. In another embodiment, the second login query 42 includes a decision point provided to the user. For example, in addition to requesting a login entry, such as a password, the second login query 42 can present a decision point question regarding whether or not the user wishes to continue with the second level login procedure. For example, the second login query 42 can include a "CONTINUE?" decision point question followed by a "LOGIN?" request.

As described above, the peripheral storage 90 of the peripheral device 48 includes a digitally signed identification value 96. The manufacturer of the peripheral device assigns the digitally signed identification value 96 to the peripheral device 48 based upon a public-key-based signature scheme. The digitally signed identification value 96 allows the controller 34 to conduct a challenge-response protocol with the peripheral device 48 to verify the identity of the peripheral device 48.

In another example, the smart card 70 is configured to conduct the challenge-response protocol with the peripheral device 48 using the digitally signed identification value 96 to verify the identity of the peripheral device 48. As described, the smart card 70 (e.g., removable storage device) has an embedded tamper-proof memory and processor. In this embodiment, the smart card 70 verifies the digitally signed identification value 96 of the peripheral devices against those previously stored on the smart card 70 in the initial configuration state 74.

In one embodiment, the smart card 70 stores a peripheral device identification value 96 of a peripheral device 48, in communication with the computerized device 32, within the memory of the smart card 70. In one embodiment, the smart card 70 stores the peripheral device identification value 96 as part of the initial configuration state 72 of the computerized device 32. The user can then remove the smart card 70 from the computerized device 32 and retain the initial configuration state 72 of the computerized device 72.

When the user reintroduces the smart card 70 to the computerized device 32, the smart card 70 receives a peripheral device identification value 96 from at least one peripheral component 48 in communication with the computerized device 32 (e.g., the smart card 70 performs the challenge portion of the challenge response protocol). In one embodiment, the smart card 70 receives the peripheral device identification value 96 as part of the subsequent configuration state 72 of the computerized device 32. After receiving the digitally signed identification value 96 from the peripheral storage 90 associated with the peripheral component 48, the smart card 70 compares the received digitally signed identification value 96 with the stored digitally signed identification value 96 to detect a variance in the peripheral device identification values. In the case where a user replaces the peripheral device 48 with a device 48 having a digital identification value 96 that differs from the value 96 associated with the computerized device 32, the smart card 70 can detect 82 a variance between the peripheral devices 48 (e.g., variance between the initial configuration state 72 and the subsequent configuration state).

Such variations are intended to be covered by the scope of this invention. As such, the foregoing description of embodiments of the invention is not intended to be limiting. Rather, any limitations to the invention are presented in the following claims.

What is claimed is:

1. A method for providing security to a computerized device, the method comprising the steps of:
   monitoring a configuration state of the computerized device to store:
      an initial configuration state of the computerized device within a storage location, the initial configuration state relating to an authorized use of the computerized device by the user;
      a subsequent configuration state within a storage location, the subsequent configuration state relating to a use of the computerized device by an unauthorized user which occurred after the authorized use by the user and includes a detection of an attachment event with respect to at least one peripheral component associated with the computerized device;
   upon the user seeking to reaccess the computerized device as the step of monitoring is performed, providing a first login query to the user;
   providing configuration state information to the user in response to receiving a login entry from the first login query, the configuration state information indicating the subsequent configuration state;
   providing a second login query to the user in response to receiving the login entry from the first login query;
   comparing the initial configuration state of the computerized device and the subsequent configuration state of the computerized device to detect a variance between the initial configuration state of the computerized device and the subsequent configuration state of the computerized device, the variance relating to the addition of the at least one peripheral component to the computerized device; and storing the configuration state information containing the variance within the storage location.

2. The method of claim 1 wherein the step of monitoring the subsequent configuration state further comprises the steps of: retrieving identification data from the peripheral component in communication with the computerized device; and
   comparing the identification data of the peripheral component with identification data logged in the initial configuration state of the computerized device.

3. The method of claim 1 wherein the step of monitoring the subsequent configuration state further comprises the steps of:
   requesting a digitally signed identification value from the peripheral component; and
   comparing the digitally signed identification value of the peripheral component with a digitally signed identification value logged in the initial configuration state of the computerized device.

4. The method of claim 1 wherein the step of storing comprises storing the initial configuration state having an associated digital signature value on a removable storage device and, subsequent to providing the first login query, further comprising the steps of:
   retrieving the initial configuration state and the associated digital signature value from the removable storage device; and
   performing an authentication process for the initial configuration state retrieved from the removable storage device using the digital signature value.

5. The method of claim 1 further comprising the step of repeating the step of monitoring at a periodic interval.

6. The method of claim 1 wherein the step of monitoring comprises the step of monitoring a configuration state of the computerized device during a time period between a logout event and a login event.

7. The method of claim 3 further comprising the step of detecting replacement of the peripheral component.

8. The method of claim 1 wherein the step of monitoring comprises the steps of:
   monitoring an attachment event for a peripheral component;
   monitoring a peripheral component identity when the peripheral component undergoes the attachment event;
   monitoring a time of the attachment event for the peripheral component; and
   storing at least one of the attachment event, the peripheral component identity, and the time of the attachment event as configuration state information within a storage location.

9. The method of claim 1 wherein the step of monitoring comprises the steps of:
   detecting a loss of power of the computerized device;
   detecting a time associated with the loss of power of the computerized device; and
   storing at least one of the loss of power and the time associated with the loss of power as configuration state information within a storage location.

10. The method of claim 1 further comprising the step of storing an initial configuration state of the computerized device within a removable storage device having an embedded tamper-proof memory and processor and wherein the step of monitoring comprises the steps of:
monitoring a subsequent configuration state of the computerized device;
initiating a login procedure with respect to the computerized device;
receiving, from the removable storage device having the embedded tamper-proof memory and processor, a configuration state query relating to the subsequent configuration state of the computerized device; and
transmitting the subsequent configuration state of the computerized device to the removable storage device having the embedded tamper-proof memory and processor for validation.

11. The method of claim 1 wherein detecting an attachment event with respect to a peripheral component associated with the computerized device comprises:
detecting a detachment of a peripheral component associated with the computerized device.

12. The method of claim 1 wherein detecting an attachment event with respect to a peripheral component associated with the computerized device comprises:
transmitting a test signal to the peripheral component to detect the presence of the peripheral component in the computerized device.

13. The method of claim 12 further comprising:
receiving an acknowledgement signal from the peripheral device in response to the test signal; and
in response to receiving the acknowledgement signal, indicating, in the configuration state information, the presence of the peripheral component in the computerized device.

14. The method of claim 12 further comprising:
if an acknowledgement signal is not received from the peripheral component during a predetermined time after transmitting the test signal, indicating, in the configuration state information, the absence of the peripheral component in the computerized device.

15. A computerized device comprising:
at least one communications interface;
a controller; and
an interconnection mechanism coupling the at least one communications interface and the controller;
wherein the computerized device is configured to:
monitor a configuration state of the computerized device;
provide a first login query to a user;
provide configuration state information to a user in response to receiving a login entry from the first login query, the configuration state information indicating the configuration state of the computerized device;
provide a second login query to a user in response to receiving the login entry from the first login query;
wherein the computerized device is further configured to store an initial configuration state of the computerized device within a storage location, the initial configuration state relating to an authorized use of the computerized device by the user and wherein the computerized device when monitoring, is configured to:
monitor a subsequent configuration state of the computerized device, the subsequent configuration state relating to a use of the computerized device by an unauthorized user which occurred after the authorized use by the user; and
compare the initial configuration state of the computerized device and the subsequent configuration state of the computerized device to detect a variance between the initial configuration state of the computerized device and the subsequent configuration state of the computerized device, the variance relating to the configuration state information of the computerized device, the variance further relating to the addition of at least one peripheral component to the computerized device;
wherein the computerized device, when monitoring the subsequent configuration state, is configured to detect an attachment event with respect to a peripheral component associated with the computerized device; and
store the configuration state information containing the variance within the storage location.

16. The computerized device of claim 15 wherein the computerized device, when monitoring the subsequent configuration state, is configured to:
retrieve identification data from the peripheral component in communication with the computerized device; and
compare the identification data of the peripheral component with identification data logged in the initial configuration state of the computerized device.

17. The computerized device of claim 15 wherein the computerized device, when monitoring the subsequent configuration state, is configured to:
request a digitally signed identification value from the peripheral component; and
compare the digitally signed identification value of the peripheral component with a digitally signed identification value logged in the initial configuration state of the computerized device.

18. The computerized device of claim 17 wherein the computerized device is configured to detecting replacement of the peripheral component.

19. The computerized device of claim 15 wherein the computerized device is configured to, while storing, store the initial configuration state having a digital signature value on a removable storage device relative to the computerized device and is further configured to:
retrieve the initial configuration state having the digital signature value from the removable storage device; and
perform an authentication process for the initial configuration state retrieved from the removable storage device using the digital signature value.

20. The computerized device of claim 15 wherein the computerized device is further configured to repeat the step of monitoring at a periodic interval.

21. The computerized device of claim 15 wherein the computerized device, when monitoring, is configured to monitor a configuration state of the computerized device during a time period between a logout event and a login event.

22. The computerized device of claim 15 wherein the computerized device, when monitoring, is configured to:
monitor an attachment event for a peripheral component;
monitor a peripheral component identity when the peripheral component undergoes the attachment event;
monitor a time of the attachment event for the peripheral component; and
store at least one of the attachment event, the peripheral component identity, and the time of the attachment event as configuration state information within a storage location.

23. The computerized device of claim 15 wherein the computerized device, when monitoring, is configured to:

detect a loss of power of the computerized device;
detect a time associated with the loss of power of the computerized device; and
store at least one of the loss of power and the time associated with the loss of power as configuration state information within a storage location.

24. The computerized device of claim 15 wherein the computerized device is further configured to store an initial configuration state of the computerized device within a removable storage device having an embedded tamper-proof memory and processor and wherein the computerized device, when monitoring, is configured to:
monitor a subsequent configuration state of the computerized device;
initiate a login procedure with respect to the computerized device;
receive, from the removable storage device having the embedded tamper-proof memory and processor, a configuration state query relating to the subsequent configuration state of the computerized device; and
transmit the subsequent configuration state of the computerized device to the removable storage device having the embedded tamper-proof memory and processor for validation.

25. The computerized device of claim 15 wherein the computerized device, when detecting an attachment event with respect to a peripheral component associated with the computerized device, is configured to:
detecting a detachment of a peripheral component associated with the computerized device.

26. A computer readable medium comprising executable instructions encoded thereon operable on a computerized device to perform processing comprising:
instructions for monitoring a configuration state of the computerized device to store:
an initial configuration state of the computerized device within a storage location, the initial configuration state relating to an authorized use of the computerized device by the user;
a subsequent configuration state within a storage location, the subsequent configuration state relating to a use of the computerized device by an unauthorized user which occurred after the authorized use by the user and includes a detection of an attachment event with respect to at least one peripheral component associated with the computerized device;
upon the user seeking to reaccess the computerized device as the step of monitoring is performed instructions for providing a first login query to the user;
instructions for providing configuration state information to the user in response to receiving a login entry from the first login query, the configuration state information indicating the subsequent configuration state;
instructions for providing a second login query to the user in response to receiving the login entry from the first login query;
instructions for comparing the initial configuration state of the computerized device and the subsequent configuration state of the computerized device to detect a variance between the initial configuration state of the computerized device and the subsequent configuration state of the computerized device, the variance relating to the addition of the at least one peripheral component to the computerized device; and instructions for storing the configuration state information containing the variance within the storage location.

27. The computer program product of claim 26 wherein the instructions operable on a processor to detect an attachment event with respect to a peripheral component associated with the computerized device comprises:
instructions operable on a processor to detect a detachment of a peripheral component associated with the computerized device.

\* \* \* \* \*